US012741909B2

(12) United States Patent
Eichler et al.

(10) Patent No.: US 12,741,909 B2
(45) Date of Patent: Sep. 22, 2026

(54) MODIFIABLE HARDENED POZZOLANIC MATERIAL

(71) Applicants: BATTELLE MEMORIAL INSTITUTE, Columbus, OH (US); GOVERNMENT OF THE UNITED STATES AS REPRESENTED BY THE SECRETARY OF THE AIR FORCE, Wright-Patterson AFB, OH (US)

(72) Inventors: Daniel Eichler, Callaway, FL (US); Kara Petty, Lynn Haven, FL (US); Matthew Catenacci, Panama City, FL (US); Raymond Petty, Lynn Haven, FL (US); Jeffery Owens, Panama City, FL (US)

( * ) Notice: Subject to any disclaimer, the term of this patent is extended or adjusted under 35 U.S.C. 154(b) by 403 days.

(21) Appl. No.: 18/297,354

(22) Filed: Apr. 7, 2023

(65) Prior Publication Data

US 2023/0322623 A1 Oct. 12, 2023

Related U.S. Application Data

(60) Provisional application No. 63/332,877, filed on Apr. 20, 2022, provisional application No. 63/328,942, filed on Apr. 8, 2022.

(51) Int. Cl.
*C04B 22/08* (2006.01)
*C04B 7/12* (2006.01)
(Continued)

(52) U.S. Cl.
CPC ................ *C04B 22/08* (2013.01); *C04B 7/12* (2013.01); *C04B 14/06* (2013.01);
(Continued)

(58) Field of Classification Search
CPC ........... C04B 22/08; C04B 7/12; C04B 14/06; C04B 2103/0088; C04B 2103/10; C04B 2103/44; C04B 28/006; C04B 28/26; C04B 14/08; C04B 14/14; C04B 14/16; C04B 18/146; C04B 18/08; C04B 14/106; C04B 18/141; C04B 14/361; C04B 18/20; C04B 20/0076; C04B 14/10; C04B 12/04
See application file for complete search history.

(56) References Cited

U.S. PATENT DOCUMENTS 9,174,869 B2 * 11/2015 Guzzetta ................. C04B 18/08
10,800,703 B1 10/2020 Eichler et al.
(Continued)

FOREIGN PATENT DOCUMENTS

WO WO-2020056470 A1 * 3/2020 ........... C04B 28/006
WO WO-2020097516 A1 * 5/2020 ............... E04B 2/18

*Primary Examiner* — Pamela H Weiss
(74) *Attorney, Agent, or Firm* — Barnes & Thornburg

(57) ABSTRACT

The present disclosure relates to formulations for cementitious materials and/or mortar prepared with minimal components. The present disclosure relates to formulations for cementitious materials and/or mortar that are low carbon dioxide ($CO_2$) emitting formulations having tailorable rheology, controllable set times, and that can be prepared with pozzolanic materials. The present disclosure relates to formulations solidified with a silicate solution to form a hardened material.

20 Claims, 10 Drawing Sheets

(51) Int. Cl.

| | |
|---|---|
| ***C04B 14/06*** | (2006.01) |
| ***C04B 103/00*** | (2006.01) |
| ***C04B 103/10*** | (2006.01) |
| ***C04B 103/44*** | (2006.01) |

(52) U.S. Cl.

CPC .. *C04B 2103/0088* (2013.01); *C04B 2103/10* (2013.01); *C04B 2103/44* (2013.01)

(56) References Cited

U.S. PATENT DOCUMENTS

| | | | | |
|---|---|---|---|---|
| 2005/0096207 | A1* | 5/2005 | Urbanek | C04B 33/1352 501/6 |
| 2014/0047999 | A1* | 2/2014 | Razl | C04B 28/021 106/676 |
| 2014/0264140 | A1* | 9/2014 | Gong | C04B 28/006 106/676 |
| 2017/0144933 | A1* | 5/2017 | Allouche | C04B 40/0633 |
| 2017/0334799 | A1* | 11/2017 | Buzruk | C05F 17/907 |
| 2020/0231503 | A1* | 7/2020 | Dubey | C04B 40/0608 |

* cited by examiner

MODIFIABLE HARDENED POZZOLANIC MATERIAL

CROSS-REFERENCE TO RELATED APPLICATIONS

This application claims priority to the following: U.S. Provisional Patent Application No. 63/328,942 filed on Apr. 8, 2022, and U.S. Provisional Patent Application No. 63/332,877 filed on Apr. 20, 2022 the disclosures of which are expressly incorporated herein.

STATEMENT OF GOVERNMENT INTEREST

The invention described herein may be manufactured and used by or for the Government of the United States for all governmental purposes without payment of any royalty thereon.

BACKGROUND

Cement mixtures are the current industry standard despite the environmental burden they pose, and with an increasing desire for more viable green construction/industrial practices cement will continue to be scrutinized. Hardened pozzolanic materials propose a potential solution to this problem by mitigating the carbon footprint that traditional cement manufacturing produces. More particularly, the use of industrial/naturally made waste products that are hardened with minimally processed resources provides an alternative to current cement formulations such as Ordinary Portland Cement (OPC). The resulting reduction of the environmental impact of such pozzolanic materials is improved further through the use of modifiable rheological properties allowing the use of 3D printing technologies that promote more environmentally friendly construction through the reduction of formworks.

Although here has been extensive research in the field of pozzolanic materials and cementitious materials with tailorable properties, there has been little to no work done on a modifiable material that uses only low processed resources that requires no complicated synthesis or manufacturing with a pozzolanic base and no cement whatsoever.

Construction via 3D printing (additive manufacturing), particularly with the use of Ordinary Portland Cement (OPC) is well established. While OPC is plentiful, it has disadvantages. OPC has a lasting impact on the environment due to its carbon footprint. In particular, the heat intensive production process of cement (OPC) production leads to the release of copious amounts of carbon dioxide into the environment. The 3D printing of large structures with cement (OPC) is also known to typically take multiple days to complete due to the long early-cure strength of cement. For example, cement is known to have an inadequate green body strength (i.e. the strength of the wet paste in the time interval before setting takes place). As a result, construction may be required to halt once a structure reaches a certain height and weight because the weight of additional layers may cause deformities through slump. The net result is extended wait times for structural layers to harden so that 3D printing may resume. In addition, the complexity of supplying cement to remote locations is also inherently costly in respect to supply and logistics. Some efforts to improve 3D printing using cements based formulations include, U.S. Pat. No. 5,588,990 which describes pozzolanic cementitious based formulations that include from about 60-85 wt % of cement, U.S. Pat. No. 5,352,288 which describes a pozzolanic material that also relies on cement (OPC) "to give the necessary green strength to the particular formed product (cinder block, brick, tile or the like) after it is formed to make the thus-formed product easier to handle without danger of breaking or deforming before the product has hydrothermally cured," and U.S. Pat. No. 4,256,500 which describes a pozzolanic material that is also dependent on OPC.

There have been some developments of material alternatives to OPC for use in 3D printing and particularly in the constructions area, but these too have disadvantages. For example, Patent CN106082898A describes a geopolymer composite material for use in 3D printing that relies on certain non-readily available and synthetic additives. Patent EP3353133B1 describes a similar material but relies on utilization of a synthetic superabsorbent polymer/copolymer. It will be appreciated that the use of such synthetic superabsorbent polymer/copolymer would not be viable in many settings, including remote locations where the synthetic superabsorbent polymer/copolymer would either need to be synthesized on a large scale using raw materials not readily available or alternatively shipped to a remote location. U.S. Pat. No. 5,601,643A describes a pozzolanic material using cement that has rapid curing properties and control over set time. Patent EP3168203A1 describes a 3D printable geopolymer that relies on powder bed printing. It will be appreciated that powder bed printing is limited in scale due to the complexity of equipment and reliance on loose powder for fabrication. The above examples demonstrate that the developments of material alternatives to OPC for use in 3D printing and particularly in the constructions area raise various disadvantages and challenges that limit their use particularly in remote areas where complex machinery or materials may be difficult to obtain or transport to.

Accordingly, there remains a significant need to develop new formulations of hardened pozzolanic materials that use materials other than cement (e.g. OPC), and can be used in large scale fabrication, for example by 3D printing, at low cost and using raw materials suitable for remote locations, particularly raw materials that are easily sourced at low cost on-site.

SUMMARY

Hardened pozzolanic materials have been researched as environmentally friendly alternatives to traditional Ordinary Portland Cement (OPC), as they produce no $CO_2$ during production and capitalize on the use of waste material, such as fly ash. The controllability of the formulation and rheology of hardened pozzolanic materials provides opportunities for form-free fabrication; and further reduces the environmental impact through the reduction/elimination of costly formworks that are used in traditional cement construction methods while also providing capabilities to have flowability up to that of regular cement. Using 3D printing technology, for example, rapid construction of structures can be achieved in remote locations with a limited labor requirement.

In accordance with one embodiment, the present disclosure relates to formulations for cementitious materials and/or mortar prepared with minimal components. More particularly, in one aspect, the present disclosure relates to formulations for cementitious materials and/or mortar that comprise low carbon dioxide ($CO_2$) emitting formulations having tailorable rheology, controllable set times, and that are prepared with pozzolanic materials. The present disclosure also relates to formulations solidified with a silicate solution to form a hardened material without the use of calcined lime.

In one embodiment, a pozzolanic mixture is provided for combination with an activator solution that comprises an alkali metal silicate, for formation of a hardened pozzolanic material. In accordance with one embodiment of the present disclosure the pozzolanic mixture is devoid of calcined lime and comprises

- an inert, fine aggregate selected from the group consisting of natural sand, manufactured sand, soil, stone, spent foundry sand, plastic shavings, recycled consumer plastics, or a combination thereof, wherein said aggregate components independently have a size ranging from about 75 μm to about 4.75 mm, optionally wherein said aggregate is natural sand;
- a pozzolanic material selected from the group consisting of calcined diatomaceous earth, volcanic ash, volcanic tuff, volcanic pumicite, opaline chert, silica particles of 100-400 nm in diameter, fly ash, metakaolin and blast furnace slag or any combination thereof, optionally wherein the pozzolanic material is a naturally occurring calcined diatomaceous earth, volcanic ash, volcanic tuff, volcanic pumicite, or opaline chert or any combination thereof; and optionally a third component;
- a viscosity modifying agent, wherein the viscosity agent is a clay having a mesh size selected from a range of about 375 to about 150 mesh. In accordance with one embodiment the pozzolanic material of the pozzolanic mixture comprises 25%, 35%, 50%, or 75% natural materials selected from calcined diatomaceous earth, volcanic ash, volcanic tuff, volcanic pumicite, or opaline chert or any combinations thereof.

In one aspect, the present disclosure is directed to a system for preparing a hardened pozzolanic material that is devoid of calcined lime but has cement-like physical properties. In one embodiment, the system comprises two separate components, an activator solution and a dry particulate component. The activator solution comprises an alkali metal silicate, and the dry component comprises a pozzolanic composition and an inert, fine aggregate, wherein combination of said activator solution with the dry component induces a chemical reaction at room temperature to form a composition having cementitious properties. Advantageously, the activator solution and dry component of the system are devoid of calcined lime. In one embodiment, the dry component further comprises a viscosity modifying agent such as a clay.

In one embodiment the system comprises an activator solution comprising a compound selected from the group consisting of sodium silicate, potassium silicate, lithium silicate, cesium silicate, amorphous silica particles of 5-50 nm in diameter, optionally wherein the activator solution comprises a potassium silicate solution or a sodium silicate solution; and the dry component comprises:

- an inert, fine aggregate selected from the group consisting of natural sand, manufactured sand, soil, stone, spent foundry sand, plastic shavings, recycled consumer plastics, or a combination thereof, wherein said aggregate has a size ranging from about 75 μm to about 4.75 mm, optionally wherein said aggregate is natural sand;
- a pozzolanic material selected from the group consisting of calcined diatomaceous earth, volcanic ash, volcanic tuff, volcanic pumicite, opaline chert, amorphous silica particles of 100-400 nm in diameter, fly ash, metakaolin and blast furnace slag, optionally wherein the pozzolanic material is a natural material selected from calcined diatomaceous earth, volcanic ash, volcanic tuff, volcanic pumicite, or opaline chert; and
- a viscosity modifying agent, wherein the viscosity agent is a clay having a mesh size selected from a range of about 375 to about 150 mesh.

In accordance with one embodiment a high strength cementitious material is provided that is devoid of calcined lime, wherein the composition comprises an alkali metal silicate composition, an inert, fine aggregate, a pozzolanic material and an optional viscosity modifying agent.

In another aspect, the present disclosure provides for a cementitious mortar composition formed by a process comprising: contacting an alkali metal silicate composition with an inert, fine aggregate, a viscosity modifying agent, and a pozzolanic material to provide a pozzolanic composition formulation; optionally ii. forming the pozzolanic composition formulation; and optionally iii. setting the pozzolanic composition formulation.

In some embodiments of these aspects, the pozzolanic composition formulation or the cementitious mortar composition does not comprise a cement, such as ordinary Portland cement. In some embodiments of these aspects, the pozzolanic composition formulation or the cementitious mortar composition is substantially free of cement, such as ordinary Portland cement.

BRIEF DESCRIPTION OF DRAWINGS

FIG. 1B demonstrates the change in viscosity when varying CFA content; FIG. 1C demonstrates the change in viscosity when varying potassium silicate (Kasolv®16; "K16") content; FIG. 1D demonstrates the change in viscosity when varying potassium oxide content; and FIG. 1E demonstrates the change in viscosity when varying sand content.

DETAILED DESCRIPTION

Definitions

Figure 1A:
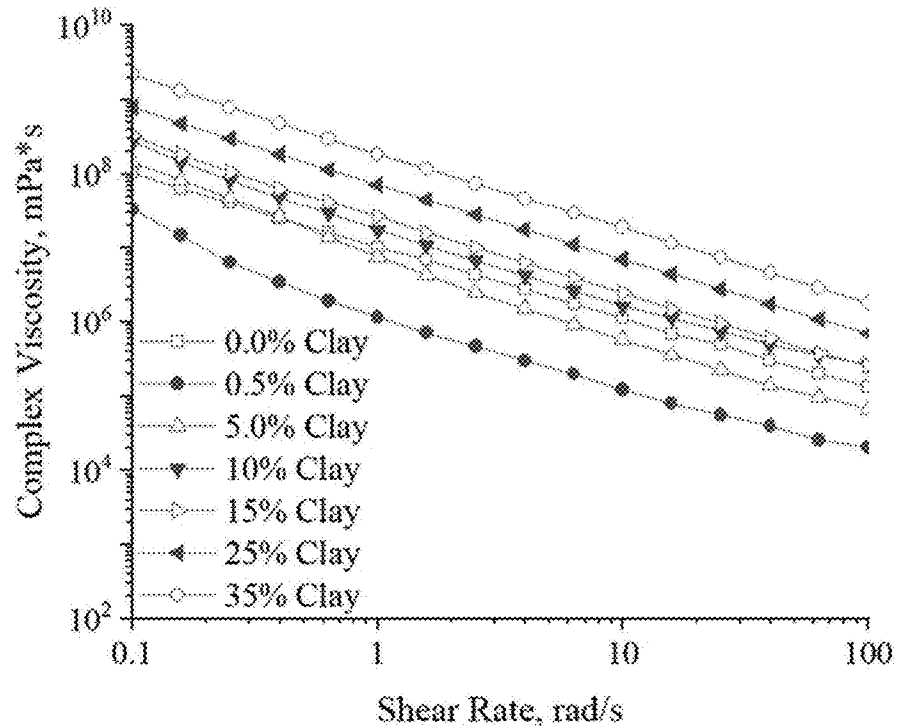
FIGS. 1A-1E are graphs demonstrating viscosity data for formulations using All-Purpose (AP) sand, bentonite clay, Class C Fly Ash (CFA), and activator at variable material concentrations. More particularly, FIG. 1A demonstrates the change in viscosity when varying clay content.
Figure 1B:
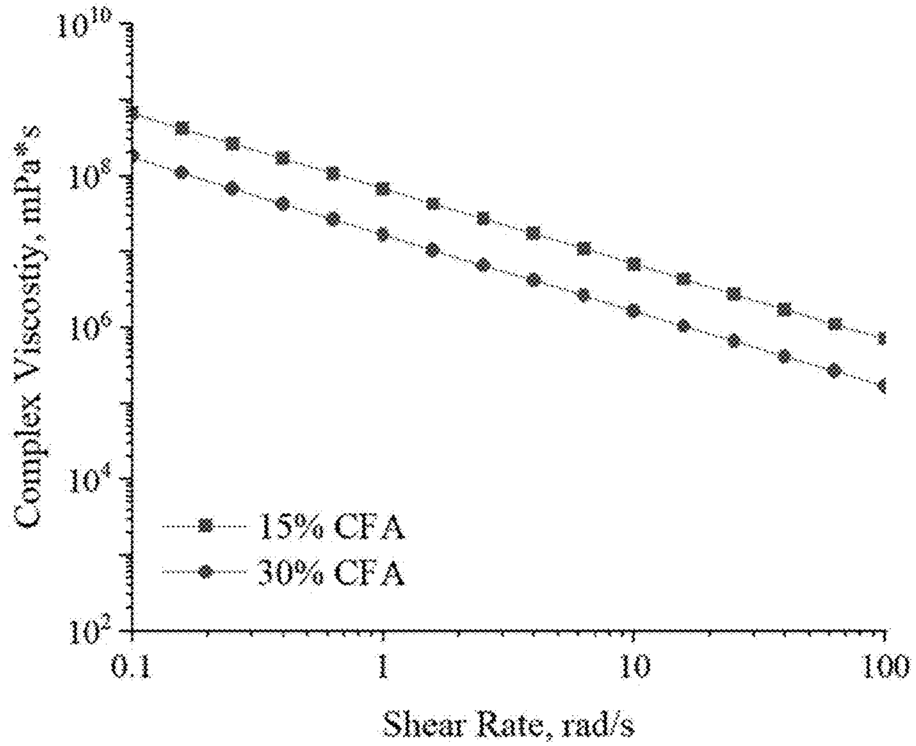
Figure 1C:
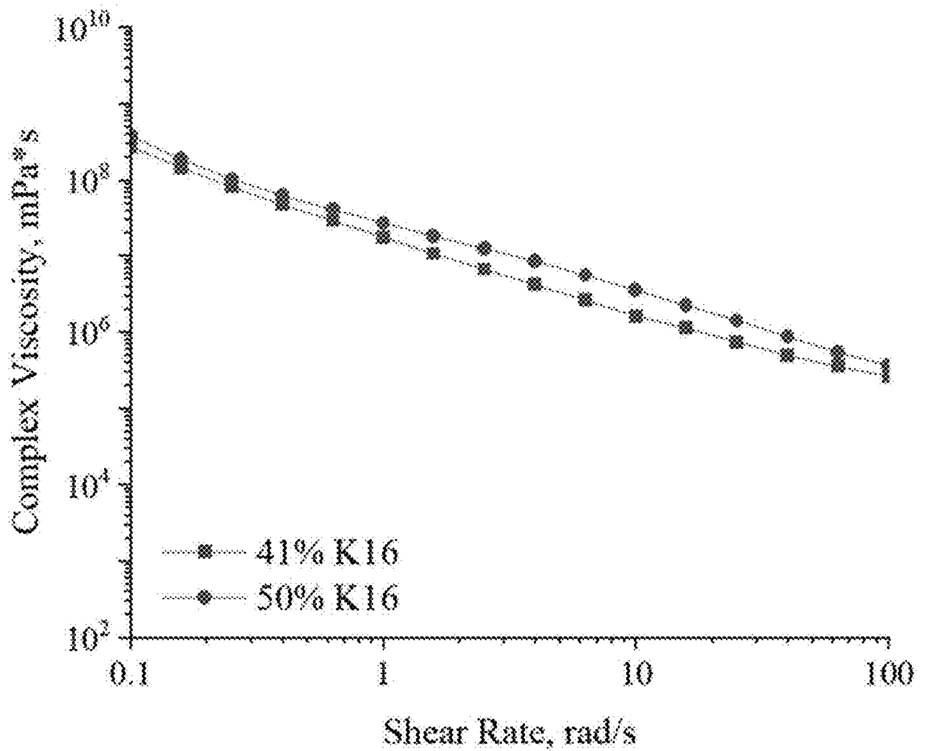
Figure 1D:
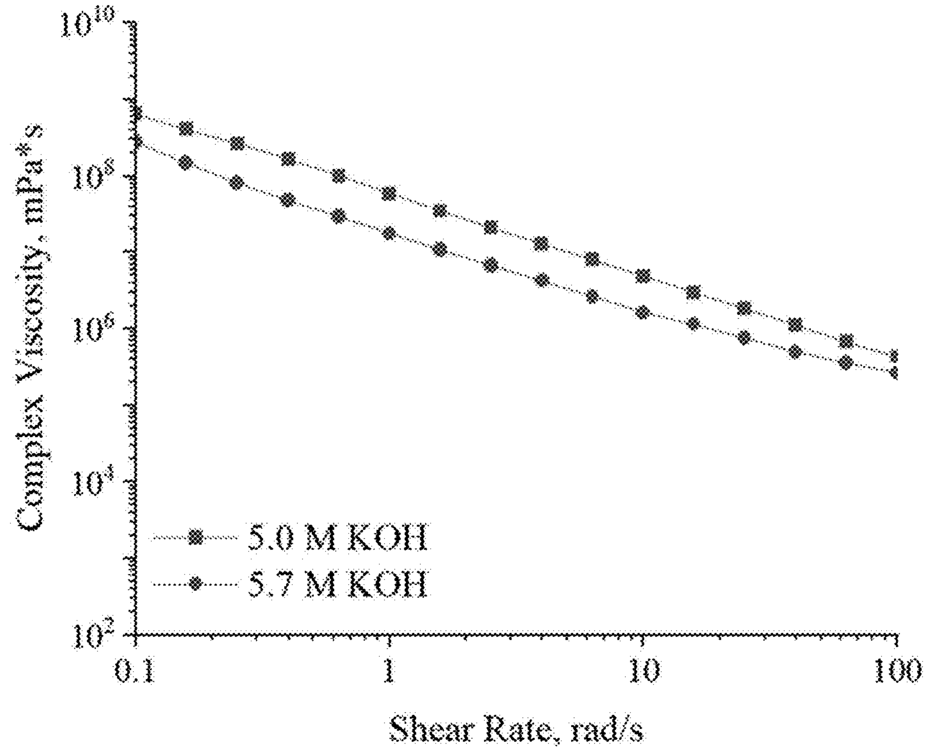
Figure 1E:
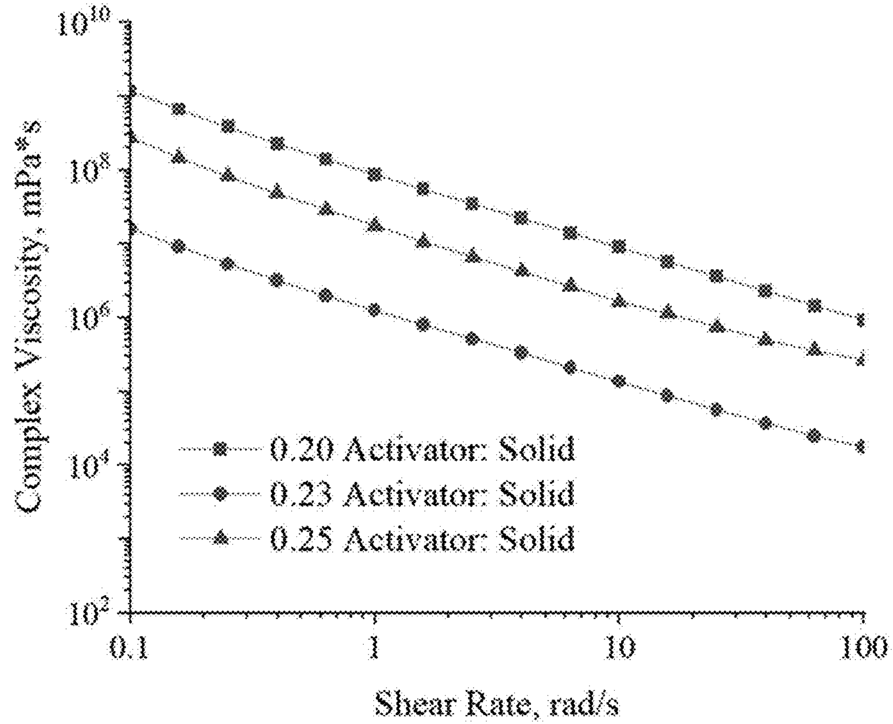

In describing and claiming the invention, the following terminology will be used in accordance with the definitions set forth below.

The term "about" as used herein means greater or lesser than the value or range of values stated by 10 percent, but is not intended to designate any value or range of values to only this broader definition. Each value or range of values preceded by the term "about" is also intended to encompass the embodiment of the stated absolute value or range of values.

As used herein, the terms "native" or "natural" define a condition found in nature. A "native compound" is a compound present in nature that was produced by natural means without intervention/initiation by humans.

As used herein, the term "clay" defines a type of fine-grained natural soil material containing clay minerals (hydrous aluminium phyllosilicates, including for example, kaolin, $Al_2Si_2O_5(OH)_4$).

As used herein, the term "fly ash" defines a fine powder coal combustion product comprised of glassy particulates.

As used herein, the term "pozzolanic material" defines a composition comprising silica that in itself possesses little or no cementitious value but will, in finely divided form and in the presence of moisture, chemically react with metal hydroxides at ordinary temperatures to form compounds having cementitious properties. Examples of natural pozzolanic material include calcined diatomaceous earth, volcanic ash, volcanic tuff, volcanic pumicite, opaline chert and shale. Examples of artificial pozzolanic material include silica fume, fly ash, metakaolin and blast furnace slag.

As used herein, the term "calcined lime" defines any alkaline compound comprising calcium oxide and includes for example, slaked lime, Ca(OH)2, Burnt dolomite (CaO—MgO), or Quick lime (CaO), which is manufactured in a calcination process requiring temperatures in excess of 900° C.

As used herein, the term "metakaolin" defines the anhydrous calcined form of the clay mineral kaolinite ($Al_2Si_2O_5(OH)_4$).

As used herein, the term "chert" defines a fine-grained sedimentary rock composed of quartz($SiO_2$); "opaline-chert" is a type of chert in which the silica includes amorphous silica (opal-A), opal CT, low-cristobalite and tridymite.

As used herein, the term "slump" defines the amount a material deforms under its own weight before setting. In one embodiment slump is represented as a percent change in a measured dimension (e.g. height).

As used herein, the term "structural recovery" defines the amount of original structure that is restored after the material is subjected to a high shear force.

Embodiments

Carbon emissions are a growing concern. Carbon emissions from construction are estimated at 38% of the total man-made emissions. The construction industry is striving to lower emissions without sacrificing quality, strength, or speed of construction. These formulations represent an excellent low-emission alternative to OPC and the controlled rheology make them ideal for additive manufacturing applications such as 3D printing, which is also a reduced carbon footprint technology. The use of waste materials and indigenous materials that are on-site further expand the "green" nature of this technology.

In accordance with one embodiment compositions are provided that exhibit an improvement on this concept by proposing a more simplistic formulation that utilizes either waste materials or materials that only require mechanical processing as opposed to relying on material that require complex chemical synthesis and/or processing. Such an invention could be utilized in the field, for example, as a construction material when combined with emerging technology such as additive manufacturing or possibly for road/runway repair as the modifiable rheological properties allow for a wide range of applications as the material may be adapted for specific uses.

The present disclosure provides methods and compositions for the formulation of environmentally sustainable hardened pozzolanic material that mitigates the use of complex additives and focuses on using minimally processed and/or readily available native materials (e.g., waste materials or indigenous soils and sands) at the point of construction, thereby reducing the logistics, resources and manpower associated with cement production. The compositions described herein can include both naturally occurring materials as well as artificial or manufactured materials. It can be advantageous for certain materials used in the compositions described herein to be naturally occurring materials and not artificial or manufactured, such as using naturally occurring additives instead of synthetic additives, to achieve the desired rheological properties.

Compared to conventional cementitious compositions and formulations, the compositions and formulations described herein can be simplified by using minimal ingredients, and by using materials that are easily obtainable in a wide range of settings for use with the compositions and formulations described herein. For example, the use of low-processed clays as a rheological additive can be advantageous, and aides in providing for a formulation that can be prepared in a wide range of locations and conditions, such as very remote locations where the importation of synthetic or manufactured viscosity modifying agents is not practical. Also, the minimal use of additives in the compositions and formulations described herein can allow the worker to tailor the compositions and formulations towards specific, desired rheological characteristics. In some embodiments, alteration of a single additive can achieve tailored product performance.

Due to the nature of pozzolanic materials, the disclosure provided herein can allow for fine control of set times and mechanical strengths (e.g., compressive, flexural, tensile). In some embodiments, the fine control of set times and mechanical strengths described herein can be tailored in real-time to accommodate cement production in various forms. For example, the control over set times allows for a finer control over geometric shapes through reducing the limitations a restrictive set time poses, such as slump. Furthermore, tailorable set times may find application in technologies such as 3D printing where continuous printing requires careful control and performance characteristics such that subsequent layers can set and harden within controlled timeframes that prevent deformities and slumping.

In some embodiments, the methods and compositions of the present disclosure may be paired with extrusion-based systems with applicability to scalable printing and general construction.

In one embodiment, a kit or system is provided for the preparation of hardened pozzolanic materials using components that have a low carbon footprint relative to standard cement formulations. In one embodiment the kit/system comprises two components, a pozzolanic mixture and an alkali metal silicate activator solution, wherein combining and mixing the pozzolanic mixture with the alkali metal silicate activator solution induces a chemical reaction resulting in a hardened pozzolanic material. In one embodiment, the pozzolanic mixture component of the kit/system is devoid of calcined lime and comprises an inert, fine aggregate and a pozzolanic material. In one embodiment the inert, fine aggregate is selected from the group consisting of natural sand, manufactured sand, soil, stone, spent foundry sand, plastic shavings, recycled consumer plastics, or a combination thereof, optionally wherein said aggregate has a size ranging from about 75 μm to about 4.75 mm. In one embodiment the pozzolanic material is selected from the group consisting of calcined diatomaceous earth, volcanic ash, volcanic tuff, volcanic pumicite, opaline chert, amorphous silica particles of 100-400 nm in diameter, fly ash, metakaolin and blast furnace slag or any combination thereof. In one embodiment the pozzolanic material comprises a fly ash content of less than or equal to about 25 wt %, about 20 wt %, about 15 wt %, about 10 wt %, or about 5 wt %. In one embodiment, the fly ash is Class C Fly Ash (CFA). In one embodiment, the pozzolanic material comprises no fly ash. In one embodiment, the pozzolanic mixture component of the kit/system further comprises a viscosity modifying agent, optionally wherein the viscosity agent is a clay having a mesh size selected from a range of about 375 to about 150 mesh. In one embodiment, the clay content of the pozzolanic mixture is selected from a range of about 0 to about 35 wt % and optionally from a range from about 5 to about 15 wt %. In one embodiment, the pozzolanic material comprises calcined diatomaceous earth, volcanic ash, volcanic tuff, volcanic pumicite, or opaline chert, or any mixture thereof. In one embodiment, the inert fine aggregate component of the pozzolanic mixture comprises silica containing particles having a sieve size within a range size of about 75 μm to about 4.75 mm, optionally wherein the silica containing particles are natural sand.

In one embodiment a system for preparing a cementitious material is provided, wherein the system comprises an activator solution and a pozzolanic mixture, wherein the activator solution comprises an alkali metal silicate and the pozzolanic mixture comprises a pozzolanic composition and an inert, fine aggregate, and the system components are devoid of calcined lime. In one embodiment, the pozzolanic mixture further comprises a viscosity modifying agent. In one embodiment the activator solution comprises a compound selected from the group consisting of sodium silicate, potassium silicate, lithium silicate, cesium silicate, amorphous silica particles of 1-70 nm in diameter, optionally wherein the activator solution comprises sodium silicate and/or potassium silicate. In one embodiment the alkali metal silicate activator solution comprises an alkali metal base in an amount up to about 50 wt % to achieve about 5.0 to about 12 M hydroxide concentration. In one embodiment, the pozzolanic material of the pozzolanic mixture is selected from the group consisting of calcined diatomaceous earth, volcanic ash, volcanic tuff, volcanic pumicite, and opaline chert, and the inert fine aggregate has a sieve size selected from a range of about 75 μm to about 4.75 mm, optionally wherein the inert fine aggregate is natural sand.

In one embodiment the system comprises an activator solution having an alkali metal silicate present in an amount of about 25 wt % to about 70 wt %, or about 30 wt % to about 70 wt %, or about 35 wt % to about 70 wt %, and the pozzolanic material of the pozzolanic mixture is present in an amount from about 10 wt % to about 80 wt %, or about 15 wt % to about 60 wt %, or about 20 wt % to about 40 wt %. In one embodiment the pozzolanic mixture further comprises a clay as the viscosity modifying agent, wherein the clay has a mesh size selected from a range of about 375 to about 150 mesh, and the pozzolanic material is calcined diatomaceous earth, volcanic ash, volcanic tuff, volcanic pumicite, or opaline chert, or any combination thereof, and the inert fine aggregate comprises silica containing particles having a sieve size within a range size of about 75 μm to about 4.75 mm.

In some embodiments, the present disclosure provides a pozzolanic composition formulation comprising an alkali metal silicate composition, an inert, fine aggregate, a viscosity modifying agent, and a pozzolanic material. It will be appreciated that the identity of the pozzolanic material is not particularly limited, and that in can be advantageous to use one or more pozzolanic materials that are readily available. In particular, it can be advantageous to utilize pozzolanic materials that are readily available in remote locations (or widely available in many locations) and/or require minimal processing prior to use. In some embodiments, the pozzolanic material can be a natural pozzolanic material or an artificial pozzolanic material. In some embodiments, the pozzolanic material can be a natural pozzolanic material, such as calcined diatomaceous earth, volcanic ash, volcanic tuff, volcanic pumicite, opaline chert, clay, shale, and the like. In some embodiments, the pozzolanic material can be an artificial pozzolanic material such as silica particles of 100-400 nm in diameter, fly ash (FA), metakaolin, blast furnace slag, and the like.

In some embodiments, it can be advantageous to use fly ash as a pozzolanic material in the methods and compositions described herein. In some embodiments, it can be advantageous to use fly ash as the active ingredient in the compositions and methods described herein. It will be appreciated that fly ash is a widely available waste material commonly resulting from electricity production at coal-fired power plants. It will be further appreciated that fly ash has a composition that includes amorphous and crystalline forms of silicates and aluminates that can be useful in the compositions and methods described herein. While not being bound by theory, it is believed that certain of the species found in the composition of fly ash, such as silicates and aluminates, behave as active species that react with alkaline activated silicate solution, such as alkali metal silicates compositions as described herein, to solidify the pozzolanic material upon setting.

It will be further appreciated that it can be advantageous to use other pozzolanic materials that are known to contain reactive species, such as silicates and aluminates in a manner analogous to fly ash. For example, metakaolin is an anhydrous calcined form of the claim mineral kaolinite. It will be further appreciated that high-reactivity metakaolin (HRM) is a processed reactive aluminosilicate pozzolanic material that is formed by calcining purified kaolinite, generally between 650-700° C. in an externally fired rotary kiln. The skilled person will recognize that the reactivity of HRM can be analogous to that of fly ash in the compositions and methods described herein. Likewise, it will be appreciated that silica fume, which is a byproduct of carbothermic reduction of high-purity quartz with carbonaceous materials like coal, coke, wood-chips, in electric arc furnaces in the production of silicon and ferrosilicon alloys, can also function as a reactive species in the compositions and methods described herein. Furthermore, it will be appreciated that any pozzolanic material from any natural or artificial (e.g. waste material byproducts such as fly ash) source can be applied to the compositions and methods described herein if the pozzolanic material includes the requisite reactive species, such as silicates and aluminates. In one embodiment natural sourced pozzolanic materials are used in the compositions and methods described herein.

It will be appreciated that the identity of the inert, fine aggregate useful in the compositions and methods described herein is not particularly limited, and that the inert, fine aggregate can be any such aggregate as defined by ASTM-C33, the contents of which are incorporated herein by reference. Suitable inert fine aggregates include but are not limited to, natural sand, manufactured sand, recycled aggregate, soil, inert, metal oxide (such as quartz, granite, corundum, and the like), stone, industrial byproducts with similar gradation to sand (such as spent foundry sand, plastic shaving, bottom ash, slag, and the like), recycled consumer products (such as waste plastics, rubber tire, glass waste, and the like), or a combination thereof. The skilled person will recognize that any such inert, fine aggregate can be used in the compositions and methods described herein. In some embodiments, it can be advantageous to use an inert, fine aggregate as defined in ASTM-C33. As noted above, without being bound by theory, it is believed that alkaline activated silicate solution reacts with the pozzolanic material to solidify the pozzolanic material, and the inert, fine aggregate acts as a filler in the composition, e.g. the cementitious mortar compositions as described herein. In some embodiments, the inert fine aggregate comprises sand.

In some embodiments, the inert fine aggregate has a sieve size of about 9.5 mm (⅜ inch), or about 4.75 mm (No. 4), or about 2.36 mm (No. 8), or about 1.18 mm (No. 16), or about 600 μm (No. 30), or about 300 μm (No. 50), or about 150 μm (No. 100), or about 75 μm (No. 200). In some embodiments, the inert fine aggregate has a sieve size in the range of about 75 μm (No. 200) to about 9.5 mm (⅜ inch), or about 150 μm (No. 100) to about 4.75 mm (No. 4), or about 300 μm (No. 50) to about 2.36 mm (No. 8), or about 600 μm (No. 30) to about 1.18 mm (No. 16). In some embodiments, the inert fine aggregate has a sieve size of less than about 9.5 mm (⅜ inch), or about 4.75 mm (No. 4), or about 2.36 mm (No. 8), or about 1.18 mm (No. 16), or about 600 μm (No. 30), or about 300 μm (No. 50), or about 150 μm (No. 100), or about 75 μm (No. 200). In some embodiments, the inert fine aggregate has a 100% passing of a No. 4 size. In some embodiments, the inert fine aggregate is well graded material. In some embodiments, the inert fine aggregate has a 100% passing of a No. 4 size and is a well graded material.

It will be appreciated that the identity of the viscosity modifying agents (VMA) useful in the compositions and methods described herein is not particularly limited, and that VMAs are comprised of a wide range of chemistries. While it will be readily appreciated that a primary function of a VMA is to modify the plastic viscosity of a flowable composition, such as the cementitious mortar or pozzolanic composition formulations described herein, it can also be advantageous to select a VMA that is capable of adjusting the rheological properties of the compositions described herein and to fine tune the methods described herein. For example, yield stress (i.e. the amount of force required to cause plastic mortar to flow) is another rheological property that can be impacted by VMAs. The impact of VMAs on yield stress can range from none to significant, depending on the type of VMA. VMAs that cause a significant increase in yield stress result in plastic mortar that requires significantly more force for the mortar to flow. It can be advantageous to select a VMA that increases viscosity without impacting yield stress. Suitable VMAs for us in connection with the compositions and methods described herein include but are not limited to inorganic materials, such as clay or colloidal silica, or larger, more complex synthetic polymers, such as hydrophobically modified ethoxylated urethane (HEUR). Other VMAs, include polymers, such as polyethylene oxides, cellulose ethers, alginates, natural and synthetic gums, polyacrylamides or polyvinyl alcohol, and the like.

In some embodiments, the VMA can be an inorganic material. In some embodiments, the VMA can be clay. It can be advantageous to the compositions and methods described herein to use clays having absorptive properties and high surface area (i.e. small grain size) that allows for water absorption and can be tailored to achieve desirable properties such as formability, extrudability, lack of slumping, controlled rheology, and inter-layer adhesion. In some embodiments, the viscosity modifying agent is a clay having a mesh size finer than about 150 mesh. In some embodiments, the viscosity modifying agent is a clay having a mesh size of from about 100 mesh to 350 mesh.

As used in the compositions and methods described herein, the liquid (e.g. aqueous) portion comes from an alkali metal silicate composition that comprises an aqueous formulation of an alkali metal silicate, amorphous silica particles of 5-50 nm in diameter, or silica extracted into an aqueous alkali metal base. It will be appreciated that the identity of the alkali metal silicate useful in the compositions and methods described herein is not particularly limited. In some embodiments, the alkali metal silicate composition comprises an aqueous formulation of an alkali metal silicate and an alkali metal base. Suitable alkali metal silicates for use in connection with the compositions and methods described herein include but are not limited to solid sodium silicate, potassium silicate, lithium silicate, cesium silicate, amorphous silica particles of 5-50 nm in diameter, and the like. In some embodiments, the alkali metal base can be a hydroxide base, such as sodium hydroxide, potassium hydroxide, cesium hydroxide or lithium hydroxide.

It can be advantageous to control the amount of base in the alkali metal silicate composition. For example, in some embodiments, the alkali metal silicate composition has a concentration of hydroxide in the alkali metal aqueous silicate solution from about 4.0 to about 12 M, or about 4.5 to about 8.0 M, or about 5.0 to about 7.5 M, or about 5.5 to about 7.0 M, or about 5.5 to about 6.5 M. in some embodiments, the alkali metal silicate composition comprises an alkali metal base in an amount of from about 0.1 wt % to about 50 wt %, or 1.0 wt % to about 40.0 wt %, or about 2.0 wt % to about 27 wt %, or 2.0 wt % to about 6.0 wt %, or about 3.0 wt % to about 6.0 wt %, about 3.5 wt % to about 5.5 wt %, about 4.0 wt % to about 5.0 wt %. In some embodiments, it can be advantageous to use silica fume as a pozzolanic material for a silica source, and to use an alkali metal silicate composition comprising an alkali metal base in an amount up to about 50 wt % to achieve approximately 8.0 M OH concentration. In other embodiments, it can be advantageous to use fly ash (FA) as a pozzolanic material for a silica source, and to use an alkali metal silicate composition comprising an alkali metal base in an amount of about 2.0 wt % to about 6.0 wt %, or about 3.0 wt % to about 6.0 wt %, about 3.5 wt % to about 5.5 wt %, about 4.0 wt % to about 5.0 wt %. In some embodiments, the alkali metal silicate composition comprises an alkali metal silicate in an amount of from about 25 wt % to about 70 wt %, or about 30 wt % to about 60 wt %, or about 35 wt % to about 50 wt %. In some embodiments, the balance of the alkali metal silicate composition is water.

In some embodiments, the alkali metal silicate compositions described herein comprise from about 15.0% to about 40.0% $SiO_2$, or about 20.0% to about 35.0% $SiO_2$, or about 25.0% to about 30.0% $SiO_2$. It will be appreciated that the % $SiO_2$ can be calculated or measured (e.g. using XRD). It will be appreciated that the nature of the silica source used, the final $SiO_2$ concentration can be variable. Therefore, the skilled person will appreciate that the type and amount of alkali metal silicate used will require either calculation of $SiO_2$ concentration (e.g. by spec sheets from a given silica source) or measured on XRD. It will be appreciated that it can be advantageous to develop a formulation or a composition that provides a specific and controlled $SiO_2$ concentration in the alkali metal silicate composition rather than simply measuring an amount of silica source in the composition. Without being bound by theory, it is believed that the $SiO_2$ concentration in the alkali metal silicate composition rather than the amount of silica source in the composition can provide for desired properties of the final composition.

In some embodiments, the disclosure provides methods for solidifying readily available materials such as pozzolanic material (e.g. fly ash), fine, inert aggregate (e.g. sand), a VMA (e.g. clay), and an alkali metal silicate compositions (e.g. alkaline-activated silicate solution). It will be appreciated that the various relative amounts of these components, and the mixing or processing can be varied to obtain workable alternatives to the specific examples described herein. The skilled person will appreciate how to modify the examples described herein within the parameters of the various components of the compositions (e.g. cementitious mortar composition or pozzolanic composition formulations) as described herein. It will be further appreciated that the properties (e.g. rheological properties) of the compositions described herein can be modified or tuned depending on the sources of the materials used and their relative amounts in the compositions. In some embodiments, the pozzolanic composition formulations described herein include pozzolanic mixtures comprising an inert, fine aggregate (e.g. sand), a viscosity modifying agent (e.g. clay), and a pozzolanic material (e.g. fly ash), and an alkali metal silicate solution (e.g. potassium silicate in aqueous potassium hydroxide) in a ratio of from 7.0:1 to 0.5:1. In some embodiments, the inert, fine aggregate is in the pozzolanic mixture in an amount from about 5 wt % to about 80 wt %, or about 15 wt % to about 70 wt %, or about 25 wt % to about 60 wt %, or about 35 wt % to about 55 wt %. In some embodiments, the viscosity modifying agent in the pozzolanic mixture is in an amount from about 0.5 wt % to about 50 wt %, or about 2.0 wt % to about 40 wt %, or about 4.0 wt % to about 30 wt %, or about 5.0 wt % to about 20 wt %, or about 6.0 wt % to about 10 wt %. In some embodiments, the pozzolanic material in the pozzolanic mixture is in an amount from about 10 wt % to about 80 wt %, or about 15 wt % to about 60 wt %, or about 20 wt % to about 40 wt %.

As previously noted, the properties (e.g. viscosity, rheological properties, and the like) of the compositions described herein can be modified or tuned depending on the sources of the materials used and their relative amounts in the compositions described herein. For example, in some embodiments, the viscosity of a pozzolanic composition formulation as described herein can be from about 2000 to about $7.5\times10^6$ mPa×Sec, or about 5000 to about $1\times10^6$ mPa×Sec, or about 10000 to about $5\times10^5$ mPa×Sec; about 50000 to about $1\times10^5$ mPa×Sec, and can be adjusted within these ranges depending on the source and relative amount of, for example, the VMA used in the composition. In some embodiments, the yield stress for flowability of a pozzolanic composition formulation as described herein can be from about 1 to about 10000 Pa, or about 100 to about 10000 Pa, or about 200 to about 10000 Pa, or about 400 to about 10000 Pa, or about 600 to about 10000 Pa, or about 800 to about 10000 Pa, or about 1000 to about 10000 Pa, or about 1200 to about 10000 Pa, or about 1400 to about 10000 Pa, or about 1600 to about 10000 Pa, and can be adjusted within these ranges depending on the source and relative amount of, for example, the VMA used in the composition.

In some embodiments, a pozzolanic composition formulation as described herein can be a non-Newtonian material that allows for its viscosity to change due to its shear thinning nature when enough force is applied to achieve the yield stress. Under such a circumstance, the viscosity of a pozzolanic composition formulation as described herein may drop, and the force required to maintain flowability may also drop. In some embodiments, the properties can be tuned in a manner such that the force required to maintain flowability may drop by up to 98%.

In some embodiments, the compositions described herein (e.g. cementitious mortar composition or pozzolanic composition formulations) does not comprise cement or calcined lime. It will be appreciated that unlike prior compositions that require cement, the compositions described herein exhibits similar control over set times, and exhibiting control over rheological properties along with set times, while not using cement.

The pozzolanic composition formulation described herein can be used in methods for manufacturing cementitious mortar compositions that can find use in various construction locations and techniques, such as 3D printing. The cementitious mortar compositions described herein can be prepared by (i) contacting an alkali metal silicate composition with an inert, fine aggregate, a viscosity modifying agent, and a pozzolanic material to provide a pozzolanic composition formulation; (ii) optionally forming the pozzolanic composition formulation into a useful shape, particularly for construction, such as a brick, block, hexagon, cylinder, pole, post, tube, T-shape, and the like, and (iii) optionally setting/solidifying/hardening the pozzolanic composition formulation to provide the formed cementitious mortar compositions.

In some embodiments, the step of contacting can be achieved by mixing the solid components of the pozzolanic composition formulation with the liquid components of the pozzolanic composition formulation in a manner sufficient to cause the viscosity of the composition to homogenize to a consistent state before using in the next step. In some embodiments, the tailored rheology and set time of the pozzolanic composition formulations described herein can be used to make the formulations 3D printable.

In some embodiments, the step of forming can be accomplished by any means known in the art for constructions materials related to cementitious compositions, such as 3D printing methods. In some embodiments, the interlayer adhesion of the pozzolanic composition formulations described herein allows for bonding between applied layers of extruded pozzolanic composition formulations described herein material for applications such as 3D printing (defined as layers of material build up on top of each other) or with another cementitious material for applications such as repairing existing structures (e.g., structures made of cement-based mortar or geopolymer). In some embodiments, the pozzolanic composition formulations described herein can be used in applications such as 3D printing, wherein the formulation exhibits 0-5% slump (defined as how much the material deforms under its own weight before setting) while maintaining the adhesion described herein. In some embodiments, the pozzolanic composition described herein can be used in applications such as 3D printing, wherein the formulation exhibits a structural recovery of a minimum of 85% after 60 seconds, wherein recovery is described as the percent of structural recovery of the material in a given time interval after being subjected to a high shear.

In some embodiments, the setting/solidifying/hardening of the pozzolanic composition formulation can be carried out at a temperature of from about 0° C. to about 70° C., or about 10° C. to about 60° C., or about 15° C. to about 50° C., or about 20° C. to about 30° C.

Using the compositions and methods described herein, it is possible to prepare a cementitious material from simple materials, such as in some embodiments where ≥80% wt. of the formulation is comprised of minimal processed materials and/or where ≥50% wt. of the formulation is comprised of waste or recycled materials. For example, in some embodiments, the cementitious mortar composition has a compressive strength of >100 psi. In some embodiments, the mortar composition has a compressive strength of >100 psi within 24 hours after the step of contacting. In some embodiments, the mortar composition has a compressive strength of between about 100 psi and about 1300 psi, or about 300 psi and about 1300 psi, or about 500 psi and about 1300 psi, or about 700 psi and about 1300 psi, or about 900 psi and about 1300 psi within 24 hours after the step of contacting. In some embodiments, pourable formulations will generally have greater compressive strength then printable formulations due to the modification of concentrations of formulation compositions required to modify the viscosity, as reduced silicate will modify rheological properties to improve printability, but will reduce compressive strength. In some embodiments, pourable formulations will generally have greater compressive strength then printable formulations due to the modification of concentrations of formulation compositions required to modify the viscosity, as reduced silicate will modify rheological properties to improve printability, but will reduce compressive strength.

The following clauses, and combinations thereof, provide various additional illustrative aspects of the invention described herein. The various embodiments described in any other section of this patent application, including the section titled "DETAILED DESCRIPTION" and the "EXAMPLES" are applicable to any of the following embodiments of the invention described in the numbered clauses below.

1. A cementitious mortar composition formed by a process comprising:

contacting an alkali metal silicate composition with an inert, fine aggregate, a viscosity modifying agent, and a pozzolanic material to provide a pozzolanic composition formulation.

2. The cementitious mortar composition of clause 1, wherein the step of contacting is between the alkali metal silicate composition and a pozzolanic mixture comprising the inert, fine aggregate, the viscosity modifying agent, and the pozzolanic material.
3. The cementitious mortar composition of clause 1 or 2, wherein the pozzolanic material is a natural pozzolanic material or an artificial pozzolanic material.
4. The cementitious mortar composition of any one of clauses 1 to 3, wherein the pozzolanic material is a natural pozzolanic material selected from the group consisting of calcined diatomaceous earth, volcanic ash, volcanic tuff, volcanic pumicite, opaline chert, clay and shale.
5. The cementitious mortar composition of any one of clauses 1 to 3, wherein the pozzolanic material is an artificial pozzolanic material selected from the group consisting of amorphous silica particles of 50-1000 nm or 100-500 nm or 150-300 nm in diameter, fly ash, and blast furnace slag, metakaolin.
6. The cementitious mortar composition of any one of the preceding clauses, wherein the viscosity modifying agent is an inorganic material.
7. The cementitious mortar composition of any one of the preceding clauses, wherein the viscosity modifying agent is a clay.
8. The cementitious mortar composition of any one of the preceding clauses, wherein the inert fine aggregate comprises natural sand, manufactured sand, recycled aggregate, soil, inert metal oxide, stone, industrial byproducts (i.e., spent foundry sand, plastic shaving), recycled consumer products, such as waste plastics, or a combination thereof.
9. The cementitious mortar composition of any one of the preceding clauses, wherein the inert fine aggregate comprises sand.
10. The cementitious mortar composition of any one of the preceding clauses, wherein the inert fine aggregate has a sieve size of about 9.5 mm (3/8 inch), or about 4.75 mm (No. 4), or about 2.36 mm (No. 8), or about 1.18 mm (No. 16), or about 600 μm (No. 30), or about 300 μm (No. 50), or about 150 μm (No. 100), or about 75 μm (No. 200).
11. The cementitious mortar composition of any one of clauses 1 to 9, wherein the inert fine aggregate has a sieve size in the range of about 75 μm (No. 200) to about 9.5 mm (3/8 inch), or about 150 μm (No. 100) to about 4.75 mm (No. 4), or about 300 μm (No. 50) to about 2.36 mm (No. 8), or about 600 μm (No. 30) to about 1.18 mm (No. 16).
12. The cementitious mortar composition of any one of clauses 1 to 9, wherein the inert fine aggregate has a sieve size of less than about 9.5 mm (3/8 inch), or about 4.75 mm (No. 4), or about 2.36 mm (No. 8), or about 1.18 mm (No. 16), or about 600 μm (No. 30), or about 300 μm (No. 50), or about 150 μm (No. 100), or about 75 μm (No. 200).
13. The cementitious mortar composition of any one of the preceding clauses, wherein the alkali metal silicate composition comprises an aqueous formulation of an alkali metal silicate, or amorphous silica particles of 1-75 nm or 5-60 nm or 10-50 nm in diameter or silica extracted into an alkali metal base.
14. The cementitious mortar composition of any one of the preceding clauses, wherein the alkali metal silicate composition comprises an aqueous formulation of an alkali metal silicate and an alkali metal base.
15. The cementitious mortar composition of any one of the preceding clauses, wherein the alkali metal silicate composition comprises an aqueous formulation of liquid or solid sodium silicate, potassium silicate, lithium silicate, cesium silicate, amorphous silica particles of 5-50 nm in diameter and an alkali metal base.
16. The cementitious mortar composition of any one of the preceding clauses, wherein the alkali metal silicate composition comprises an aqueous formulation of liquid or solid sodium silicate, potassium silicate, lithium silicate, cesium silicate, or amorphous silica particles of 5-50 nm in diameter and an alkali metal base that is a hydroxide base.
17. The cementitious mortar composition of any one of the preceding clauses, wherein the alkali metal silicate composition comprises an aqueous formulation of liquid or solid sodium silicate, potassium silicate, lithium silicate, cesium silicate, or amorphous silica particles of 5-50 nm in diameter and an alkali metal base that is sodium hydroxide, potassium hydroxide, cesium hydroxide or lithium hydroxide.
18. The cementitious mortar composition of any one of the preceding clauses, wherein the alkali metal silicate composition has a concentration of hydroxide in the alkali metal aqueous silicate solution from about 4.0 to about 12.0 M, or about 4.5 to about 8.0 M, or about 5.0 to about 7.5 M, or about 5.5 to about 7.0 M, or about 5.5 to about 6.5 M.

19. The cementitious mortar composition of any one of the preceding clauses, wherein the alkali metal silicate composition comprises an alkali metal silicate in an amount of from about 25 wt % to about 70 wt %, or about 30 wt % to about 60 wt %, or about 35 wt % to about 50 wt %.

20. The cementitious mortar composition of any one of the preceding clauses, wherein the alkali metal silicate composition comprises an alkali metal base in an amount of from about 0.1 wt % to about 35 wt %, or 1.0 wt % to about 40.0 wt %, or 2.0 wt % to about 6.0 wt %, or about 3.0 wt % to about 6.0 wt %, about 3.5 wt % to about 5.5 wt %, about 4.0 wt % to about 5.0 wt %.

21. The cementitious mortar composition of clause 19 or 20, wherein the balance of the alkali metal silicate composition is water.

22. The cementitious mortar composition of any one of the preceding clauses, wherein the alkali metal silicate composition comprises from about 15.0% to about 40.0% $SiO_2$, or about 20.0% to about 35.0% $SiO_2$, or about 25.0% to about 30.0% $SiO_2$.

23. The cementitious mortar composition of clauses 2 to 22, wherein the pozzolanic composition formulation comprises a pozzolanic mixture comprising the inert, fine aggregate, the viscosity modifying agent, and the pozzolanic material and an alkali metal silicate solution in a ratio of from 7.0:1 to 0.5:1.

24. The cementitious mortar composition of any one of the preceding clauses, wherein the inert, fine aggregate is in the pozzolanic mixture is in an amount from about 5 wt % to about 80 wt %, or about 15 wt % to about 70 wt %, or about 25 wt % to about 60 wt %, or about 35 wt % to about 55 wt %.

25. The cementitious mortar composition of any one of the preceding clauses, wherein the viscosity modifying agent is in the pozzolanic mixture is in an amount from about 0.5 wt % to about 50 wt %, or about 2.0 wt % to about 40 wt %, or about 4.0 wt % to about 30 wt %, or about 5.0 wt % to about 20 wt %, or about 6.0 wt % to about 10 wt %.

26. The cementitious mortar composition of any one of the preceding clauses, wherein the pozzolanic material is in the pozzolanic mixture is in an amount from about 10 wt % to about 80 wt %, or about 15 wt % to about 60 wt %, or about 20 wt % to about 40 wt %.

27. The cementitious mortar composition of any one of the preceding clauses, further comprising
forming the pozzolanic composition formulation.

28. The cementitious mortar composition of any one of the preceding clauses, wherein the cementitious mortar composition is in the form of a slab, wall, structure, brick, block or cube.

29. The cementitious mortar composition of any one of the preceding clauses, further comprising
setting the pozzolanic composition formulation at a temperature of from about 0° C. to about 70° C., or about 10° C. to about 60° C., or about 15° C. to about 50° C., or about 20° C. to about 30° C.

30. The cementitious mortar composition of any one of the preceding clauses, wherein step (ii) is from about 1 minute to about 30 hours, or from about 6 hours to about 24 hours, with a compressive strength of about 100 psi or greater.

31. The cementitious mortar composition of any one of the preceding clauses, wherein the viscosity modifying agent is a clay having a mesh size finer than about 150 mesh.

32. The cementitious mortar composition of any one of the preceding clauses, wherein the viscosity modifying agent is a clay having a mesh size of from about 100 mesh to 350 mesh.

33. The cementitious mortar composition of any one of the preceding clauses, wherein the viscosity of the pozzolanic composition formulation is from about 2000 to about $1.0\times10^{10}$ mPa×Sec, or about 2000 to about $1.0\times10^{8}$ mPa×Sec, or about 2000 to about $7.5\times10^{6}$ mPa×Sec, or about 5000 to about $1\times10^{6}$ mPa×Sec, or about 10000 to about $5\times10^{5}$ mPa×Sec; about 50000 to about $1\times10^{5}$ mPa×Sec.

34. The cementitious mortar composition of any one of the preceding clauses, wherein the yield stress for flowability of the pozzolanic composition formulation is from about 1 to about 10000 Pa, or about 100 to about 6500 Pa, or about 200 to about 6000 Pa, or about 400 to about 5500 Pa, or about 600 to about 5000 Pa, or about 800 to about 4500 Pa, or about 1000 to about 4000 Pa, or about 1200 to about 3500 Pa, or about 1400 to about 3000 Pa, or about 1600 to about 2000 Pa.

35. The cementitious mortar composition of any one of the preceding clauses, wherein the forming step (ii) is carried out by layering of the pozzolanic composition formulation into a form.

36. The cementitious mortar composition of any one of the preceding clauses, wherein cementitious mortar composition does not comprise cement.

37. The cementitious mortar composition of any one of the preceding clauses, wherein the pozzolanic composition formulation exhibits from about 0 to about 5% change in one dimension (slump), optionally 0 to about 5% change in height when printing three inches of material layered on top of each other after 30 min.

38. The cementitious mortar composition of any one of the preceding clauses, wherein the cementitious mortar composition has a compressive strength of >100 psi.

39. The cementitious mortar composition of any one of the preceding clauses, wherein the cementitious mortar composition has a compressive strength of >100 psi within 24 hours after the step of contacting.

40. The cementitious mortar composition of any one of the preceding clauses, wherein the cementitious mortar composition has a compressive strength of between about 100 psi and about 1300 psi, or about 300 psi and about 1300 psi, or about 500 psi and about 1300 psi, or about 700 psi and about 1300 psi, or about 900 psi and about 1300 psi within 24 hours after the step of contacting.

41. A pozzolanic composition formulation comprising an alkali metal silicate composition, an inert, fine aggregate, a viscosity modifying agent, and a pozzolanic material.

42. The pozzolanic composition formulation of clause 41, wherein the pozzolanic material is a natural pozzolanic material or an artificial pozzolanic material.

43. The pozzolanic composition formulation of clause 41 or 42, wherein the pozzolanic material is a natural pozzolanic material selected from the group consisting of calcined diatomaceous earth, volcanic ash, volcanic tuff, volcanic pumicite, opaline chert, clay and shale.

44. The pozzolanic composition formulation of any one of clauses 41 to 43, wherein the pozzolanic material is an artificial pozzolanic material selected from the group consisting of amorphous silica particles of 100-400 nm in diameter, fly ash, metakaolin and blast furnace slag.
45. The pozzolanic composition formulation of any one of clauses 41 to 44, wherein the viscosity modifying agent is an inorganic material.
46. The pozzolanic composition formulation of any one of clauses 41 to 45, wherein the viscosity modifying agent is a clay.
47. The pozzolanic composition formulation of any one of clauses 41 to 46, wherein the inert fine aggregate comprises natural sand, manufactured sand, recycled aggregate, soil, stone, industrial byproducts, recycled consumer products, or a combination thereof.
48. The pozzolanic composition formulation of any one of clauses 41 to 47, wherein the inert fine aggregate comprises sand.
49. The pozzolanic composition formulation of any one of clauses 41 to 48, wherein the inert fine aggregate has a sieve size of about 9.5 mm (⅜ inch), or about 4.75 mm (No. 4), or about 2.36 mm (No. 8), or about 1.18 mm (No. 16), or about 600 μm (No. 30), or about 300 μm (No. 50), or about 150 μm (No. 100), or about 75 μm (No. 200).
50. The pozzolanic composition formulation of any one of clauses 41 to 48, wherein the inert fine aggregate has a sieve size in the range of about 75 μm (No. 200) to about 9.5 mm (⅜ inch), or about 150 μm (No. 100) to about 4.75 mm (No. 4), or about 300 μm (No. 50) to about 2.36 mm (No. 8), or about 600 μm (No. 30) to about 1.18 mm (No. 16).
51. The pozzolanic composition formulation of any one of clauses 41 to 48, wherein the inert fine aggregate has a sieve size of less than about 9.5 mm (⅜ inch), or about 4.75 mm (No. 4), or about 2.36 mm (No. 8), or about 1.18 mm (No. 16), or about 600 μm (No. 30), or about 300 μm (No. 50), or about 150 μm (No. 100), or about 75 μm (No. 200).
52. The pozzolanic composition formulation of any one of clauses 41 to 51, wherein the alkali metal silicate composition comprises an aqueous formulation of an alkali metal silicate, or amorphous silica particles of 5-50 nm in diameter or silica extracted into an alkali metal base.
53. The pozzolanic composition formulation of any one of clauses 41 to 52, wherein the alkali metal silicate composition comprises an aqueous formulation of an alkali metal silicate, fume silica or silica extracted into an alkali metal base, and an alkali metal base.
54. The pozzolanic composition formulation of any one of clauses 41 to 53, wherein the alkali metal silicate composition comprises an aqueous formulation of solid or liquid sodium silicate, potassium silicate, lithium silicate, cesium silicate or amorphous silica particles of 5-50 nm in diameter and an alkali metal base.
55. The pozzolanic composition formulation of any one of clauses 41 to 54, wherein the alkali metal silicate composition comprises an aqueous formulation of liquid or solid sodium silicate, potassium silicate, lithium silicate, cesium silicate, or amorphous silica particles of 5-50 nm in diameter and an alkali metal base that is a hydroxide base.
56. The pozzolanic composition formulation of any one of clauses 41 to 55, wherein the alkali metal silicate composition comprises an aqueous formulation of liquid or solid sodium silicate, potassium silicate, lithium silicate, or cesium silicate, or amorphous silica particles of 5-50 nm in diameter and an alkali metal base that is sodium hydroxide, potassium hydroxide, cesium or lithium hydroxide.
57. The pozzolanic composition formulation of any one of clauses 41 to 56, wherein the alkali metal silicate composition has a concentration of hydroxide in the alkali metal aqueous silicate solution from about 4.0 to about 8.5 M, or about 4.5 to about 8.0 M, or about 5.0 to about 7.5 M, or about 5.5 to about 7.0 M, or about 5.5 to about 6.5 M.
58. The pozzolanic composition formulation of any one of clauses 41 to 57, wherein the alkali silica source (alkali metal silicate, or fume silica) composition comprises an alkali metal silicate in an amount of from about 25 wt % to about 70 wt %, or about 30 wt % to about 60 wt %, or about 35 wt % to about 50 wt %.
59. The pozzolanic composition formulation of any one of clauses 41 to 58, wherein the alkali metal silicate composition comprises an alkali metal base in an amount of from about 0.1%-30% 2.0 wt % to about 6.0 wt %, or about 3.0 wt % to about 6.0 wt %, about 3.5 wt % to about 5.5 wt %, about 4.0 wt % to about 5.0 wt %.
60. The pozzolanic composition formulation of clause 58 or 59, wherein the balance of the alkali metal silicate composition is water.
61. The pozzolanic composition formulation of any one of clauses 41 to 60, wherein the alkali metal silicate composition comprises from about 15.0% to about 40.0% $SiO_2$, or about 20.0% to about 35.0% $SiO_2$, or about 25.0% to about 30.0% $SiO_2$.
62. The pozzolanic composition formulation of any one of clauses 41 to 61, wherein the pozzolanic composition formulation comprises a pozzolanic mixture comprising the inert, fine aggregate, the viscosity modifying agent, and the pozzolanic material and an alkali metal silicate solution in a ratio of from 7.0:1 to 0.5:1.
63. The pozzolanic composition formulation of any one of clauses 41 to 62, wherein the inert, fine aggregate is in the pozzolanic mixture is in an amount from about 5 wt % to about 80 wt %, or about 15 wt % to about 70 wt %, or about 25 wt % to about 60 wt %, or about 35 wt % to about 55 wt %.
64. The pozzolanic composition formulation of any one of clauses 41 to 63, wherein the viscosity modifying agent is in the pozzolanic mixture is in an amount from about 0.5 wt % to about 50 wt %, or about 2.0 wt % to about 40 wt %, or about 4.0 wt % to about 30 wt %, or about 5.0 wt % to about 20 wt %, or about 6.0 wt % to about 10 wt %.
65. The pozzolanic composition formulation of any one of clauses 41 to 64, wherein the viscosity modifying agent is in the pozzolanic mixture is in an amount from about 0.5 wt % to about 50 wt %, or about 2.0 wt % to about 40 wt %, or about 4.0 wt % to about 30 wt %, or about 5.0 wt % to about 20 wt %, or about 6.0 wt % to about 10 wt %.

66. The pozzolanic composition formulation of any one of clauses 41 to 65, of any one of the preceding clauses, wherein cementitious mortar composition does not comprise cement.

67. The pozzolanic composition formulation of any one of clauses 41 to 66, wherein the viscosity modifying agent is a clay having a mesh size finer than about 150 mesh.

68. The pozzolanic composition formulation of any one of clauses 41 to 67, wherein the viscosity modifying agent is a clay having a mesh size of from about 150 mesh to 350 mesh.

69. The pozzolanic composition formulation of any one of clauses 41 to 68, wherein the viscosity of the pozzolanic composition formulation is from about 2000 to about $7.5\times10^6$ mPa×Sec, or about 5000 to about $1\times10^6$ mPa×Sec, or about 10000 to about $5\times10^5$ mPa_33 Sec; about 50000 to about $1\times10^5$ mPa×Sec.

70. The pozzolanic composition formulation of any one of clauses 41 to 69, wherein the yield stress for flowability of the pozzolanic composition formulation is from about 1 to about 10000 Pa, or about 100 to about 6500 Pa, or about 200 to about 6000 Pa, or about 400 to about 5500 Pa, or about 600 to about 5000 Pa, or about 800 to about 4500 Pa, or about 1000 to about 4000 Pa, or about 1200 to about 3500 Pa, or about 1400 to about 3000 Pa, or about 1600 to about 2000 Pa.

71. The pozzolanic composition formulation of any one of clauses 41 to 70, wherein the fly ash content is 25 wt % or less.

72. The pozzolanic composition formulation of any one of clauses 41 to 71, wherein the fly ash comprises Class C fly ash.

EXAMPLES

Example 1: Material Formulation

A pozzolanic material is typically made up of 4 different parts: a fine aggregate, a clay, a pozzolan, and an alkali metal silicate solution (activator). By modifying these 4 materials, the set time, compressive strength, rheological properties (yield strength, and viscosity) and buildability are changed. As disclosed herein, several formulations have been developed and tested.

Preparation of activator solution is performed by mixing a hydroxide in water, followed by the addition of a silica source [liquid or solid silicate, or Fumed Silica (FS)] to achieve a desired hydroxide concentration of 4.0-12.0 M and a $SiO_2$ concentration between 18.0-40%. An example of this preparation is 41% Kasolv® 16 (K16) acquired from PQ Corporation (Valley Forge, PA) with a 5.7 M KOH. This activator solution is prepared by adding 1803.7 g of tap water to a high-density polyethylene (HDPE) container and stirring with a stir bar and stir plate. Followed by the addition of 142.9 g of KOH acquired from Duda Energy (Decatur, AL), and 1253.4 g of K16. The solution is stirred 24 hr before use.

Example 2: Material Characterization

Characterization of the activator solutions was performed on all solutions made by analyzing their water, $SiO_2$, $Na_2O$ and/or $K_2O$ mass percentages. Si, K, Na, and water concentrations were measured using a Rigaku Nex CG X-ray fluorimeter (Rigaku Corp., Tokyo, Japan) using: an RX9 target with a tube voltage of 25 kV for 100 s, an Si target with a tube voltage of 25 kV for 60 s, and a Cu and Mo target with a tube voltage of 50 kV for 60 s. A fundamental parameters (FP) method for each type of activator (potassium silicate with KOH, and sodium silicate with NaOH) was used to calculate the $SiO_2$, $K_2O$, $Na_2O$, and water mass percentages using the appropriate matching library. Actual mass percentages of $SiO_2$, $Na_2O$, and $K_2O$ from the standard solutions were used to create the matching library with water serving as the balance.

To prepare samples, an activator solution was poured into to a plastic sample cup—which used a polypropylene TF-240 film sandwiched between two plastic rings to produce a cup—to a volume that gave a sample height of 3 cm. From this data, the $SiO_2$:MO ratio (MO=$K_2O$, $Na_2O$ or the combination of the two) was also calculated. Table 1 shows all the activator solutions created, including varying silica sources, and the XRF data from them.

TABLE 1

$SiO_2$ and $K_2O/Na_2O$ mass percentages for each activator solution

| Activator | Silica source | % $SiO_2$ | OH | % $K_2O/Na_2O$ |
|---|---|---|---|---|
| K165.7K | 41% K16 | 24.8 ± .65% | 5.7M KOH | 18.1 ± .15% |
| K165K | 41% K16 | 25.5 ± .35% | 5.0M KOH | 16.2 ± .06% |
| K167K | 41% K16 | 21.2 ± 06% | 7.0M KOH | 18.7 ± .06% |
| K169K | 41% K16 | 21.9 ± .12% | 9.0M KOH | 25.3 ± .15% |
| 30K16 5.7K | 30% K16 | 18.1 ± .06% | 5.7M KOH | 19.3 ± .00% |
| 50K16 6.7K | 50% K16 | 32.7 ± .12% | 6.7M KOH | 19.9 ± .06% |
| 60K16 12K | 60% K16 | 34.2 ± .12% | 12.0M KOH | 27.7 ± .12% |
| N11N | N | 26.0 ± .25% | 11.0M NaOH | 21.2 ± .46% |
| 30FS5.3K | 30% FS | 25.6 ± .06% | 5.3M KOH | 19.7 ± .00% |

Example 3: Material Preparation and Evaluation

Preparation of pozzolanic material was performed by mixing all dry materials (fine aggregate, clay, and pozzolan) as a mass percentage of dry solids, then adding the activator solution and mixing until thoroughly combined. An example is 1755 g of All-Purpose sand (Quikrete®) (AP) acquired from Mid-South Lumber (Panama City, FL), 270 g of 325 mesh Bentonite clay acquired from The Ceramic Shop (Norristown, PA), and 675 g Miller Class C Fly Ash (CFA) acquired from Headwater Resources (Quinton, AL). These were added and mixed in a stainless-steel mixing bowl. Then, 540 g of 41% K16 5.7 M KOH activator solution is added to the dry solids and mixed until fully incorporated. Table 2 shows formulations tested and the compressive strength, set time, and yield strength of each.

TABLE 2

Pozzolanic Material Formulations to include set time, 24 hr compressive strength, and yield strength.

| # | Activator | % Solid material AP Sand | Miller CFA | Bentonite Clay | Activator: Solid | Set time, min | Yield strength, pa | 24 hr Compressive Strength, psi |
|---|---|---|---|---|---|---|---|---|
| 1 | K165.7K | 70% | 25% | 5% | 0.18 | 95.00 | 1104.50 | 1145.0 ± 68.0 |
| 2 | K165.7K | 60% | 25% | 15% | 0.25 | >120 | 3428.80 | 160.8 ± 18.1 |
| 3 | K165.7K | 50% | 25% | 25% | 0.31 | >120 | 729.48 | 140.8 ± 8.0 |
| 4 | K165.7K | 40% | 25% | 35% | 0.33 | 110.00 | 1403.80 | 135.8 ± 10.4 |
| 5 | K165.7K | 75% | 25% | 0% | 0.21 | >120 | 60.46 | 975.1 ± 37.9 |
| 6 | K165.7K | 75% | 25% | 0.5% | 0.18 | >120 | 833.10 | 978.0 ± 29.5 |
| 7 | K165.7K | 65% | 25% | 10% | 0.25 | >120 | 4179.00 | 218.5 ± 16.1 |
| 8 | K165.7K | 65% | 25% | 10% | 0.20 | 100.00 | 2332.50 | 248.7 ± 4.1 |
| 9 | K165.7K | 65% | 25% | 10% | 0.23 | >120 | 6091.00 | 210.4 ± 7.0 |
| 10 | K165.7K | 75% | 15% | 10% | 0.18 | >120 | 3159.90 | 128.3 ± 1.4 |
| 11 | K165.7K | 45% | 45% | 10% | 0.25 | 35.00 | NA | 1255.3 ± 51.0 |
| 12 | K165.7K | 20% | 70% | 10% | 0.27 | 30.00 | NA | 1322.3 ± 162.6 |
| 13 | K165K | 65% | 25% | 10% | 0.23 | 100.00 | 6235.00 | 156.6 ± 9.5 |
| 14 | K167K | 65% | 25% | 10% | 0.23 | 15.00 | NA | 748.1 ± 20.4 |
| 15 | K169K | 65% | 25% | 10% | 0.23 | 10.00 | NA | 851.5 ± 88.8 |
| 16 | 30K165.7K | 65% | 25% | 10% | 0.23 | 10.00 | NA | 545.2 ± 37.1 |
| 17 | 50K166.7K | 65% | 25% | 10% | 0.23 | >120 | 1202.20 | 174.2 ± 8.8 |
| 18 | N11N | 65% | 25% | 10% | 0.24 | >120 | 1638.00 | 505.7 ± 17.7 |
| 19 | 60K1612K | 75% | 15% | 10% | 0.25 | >120 | 9556.70 | 616.4 ± 19.4 |
| 20 | 30FS5.3K | 65% | 25% | 10% | 0.23 | >120 | 1613.30 | 949.7 ± 23.1 |

TABLE 3

Alternative solid ingredient formulations and their set time, 24 hr compressive strength, and yield strength

| # | Activator | Fine Aggregate | Pozzolan | Clay | % Solid Material Fine Aggregate | Pozzolan | Clay | Activator: Solid | Set Time, min | yield strength, pa | 24 hr Compressive Strength, psi |
|---|---|---|---|---|---|---|---|---|---|---|---|
| 1 | K165.7K | AP sand | Miller CFA | Bentonite | 75% | 25% | 5% | 0.18 | 95 | 1104.5 | 1145.0 ± 68.0 |
| 20 | K165.7K | AP sand | Miller CFA | Ball | 75% | 25% | 5% | 0.15 | 70 | 4196.3 | 940.2 ± 30.8 |
| 21 | 45K168.1K | AP sand | Metakaolin | Bentonite | 75% | 25% | 5% | 0.35 | >120 | 1793.3 | 815.1 ± 31.9 |
| 22 | K165.7K | Glass | Miller CFA | Bentonite | 75% | 25% | 5% | 0.18 | 90 | 449.2 | 988.3 ± 67.8 |
| 23 | K165.7K | AP sand | 75% 3M/ 25% CFA | Bentonite | 75% | 25% | 5% | 0.18 | 115 | 1614.8 | 309.1 ± 9.3 |

To determine the effects of changing the concentration of the materials in the formulation, compressive strength and set time properties of the formulations were tested on 2-in cubes. After thoroughly mixing the material to fully incorporate the ingredients, the material was poured into 2-in cubes. The samples were either immediately tested for set time using a ViCat apparatus or cured at room temperature (RT) 22° C. for compressive strength testing. Changes to these mechanical properties are shown in Table 2.

To determine the effects of changing the concentrations of the materials in the formulation on rheological properties, yield strength and viscosity were measured. All the rheological tests were performed using a Modular Compact Rheometer (MCR 302e) from Anton-Paar. The samples were subjected to an amplitude sweep to obtain the yield strengths of the material and a frequency sweep to obtain the viscosity properties of the formulations. Immediately upon completion of mixing, a rheological test is performed at a constant temperature of 25° C. Results of the amplitude sweeps have yield strengths shown in Table 2, and frequency sweep results shown in FIG. 1 and FIG. 3.

Figure 2:
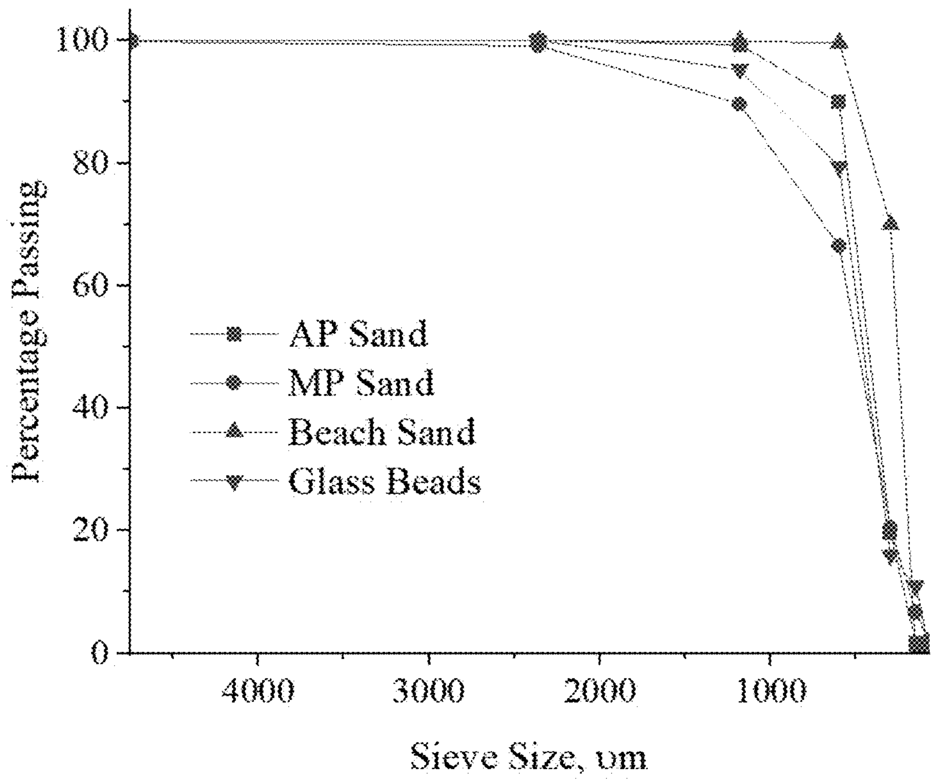
FIG. 2 is a graph demonstrating the gradation of standard fine aggregates, and the gradation of glass bead aggregate used in the present invention.

Alternative materials were tested for each specific ingredient in the formulation. Two other silica sources were tested to produce an activator N® liquid sodium silicate acquired from PQ Corporation, and Fume Silica (FS) acquired from ITP, (Huntingdon Valley, PA). Another hydroxide type was tested, sodium hydroxide (NaOH) acquired from Duda Energy. The fine aggregate alternative was glass beads used for sand blasting, acquired from Seva, (Newport News, VA). To see the effects of changing the material itself, a similar fine aggregate gradation was produced. Gradation of several off-the-shelf fine aggregates are compared to the glass bead fine aggregate in FIG. 2.

The alternative clay tested was OM4 Ball Clay acquired from The Ceramic Shop. Two types of alternative pozzolans were tested; metakaolin (Meta) acquired from Concrete Depo LLC (Shawnee, OK) as an alternative artificial pozzolan, and Nepheline Syenite (NS) acquired from 3M (Little Rock, AR) as an alternative natural pozzolan. Table 3 shows the alternative formulations along with the set time, compressive strength, and yield strength.

Figure 3A:
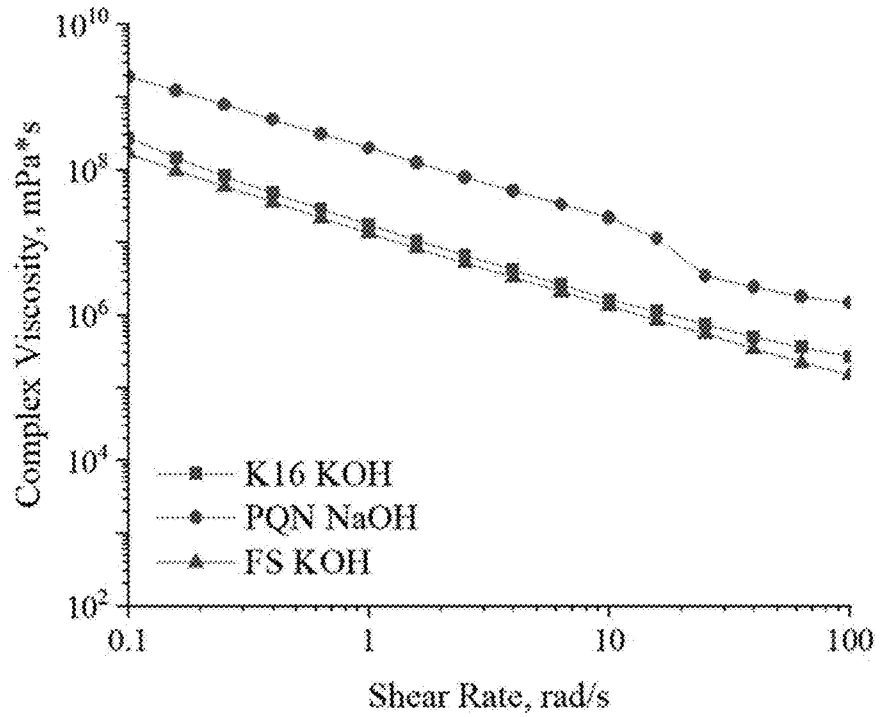
FIGS. 3A and 3B are graphs showing the viscosity of materials with modified components in both the activator (FIG. 3A) and the dry mixture (FIG. 3B).
Figure 3B:
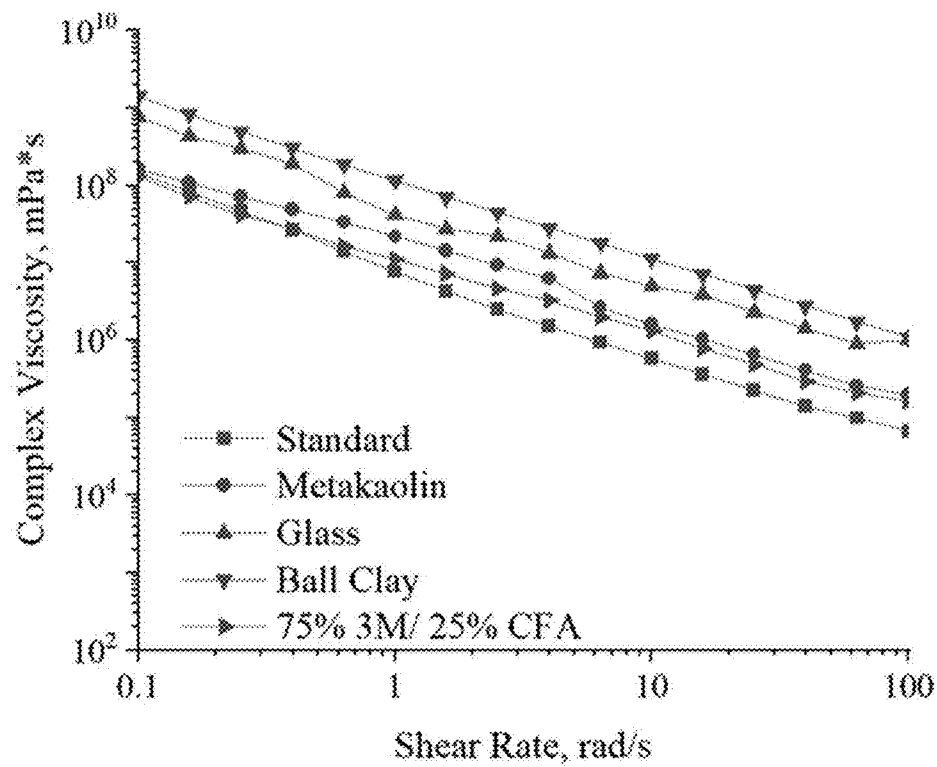

Viscosity was also measured for these formulations, as done with the other formulations, with frequency sweep data shown in FIG. 3.

Printing of Pozzolanic materials was tested to determine the buildability of formulations.

Figure 4:
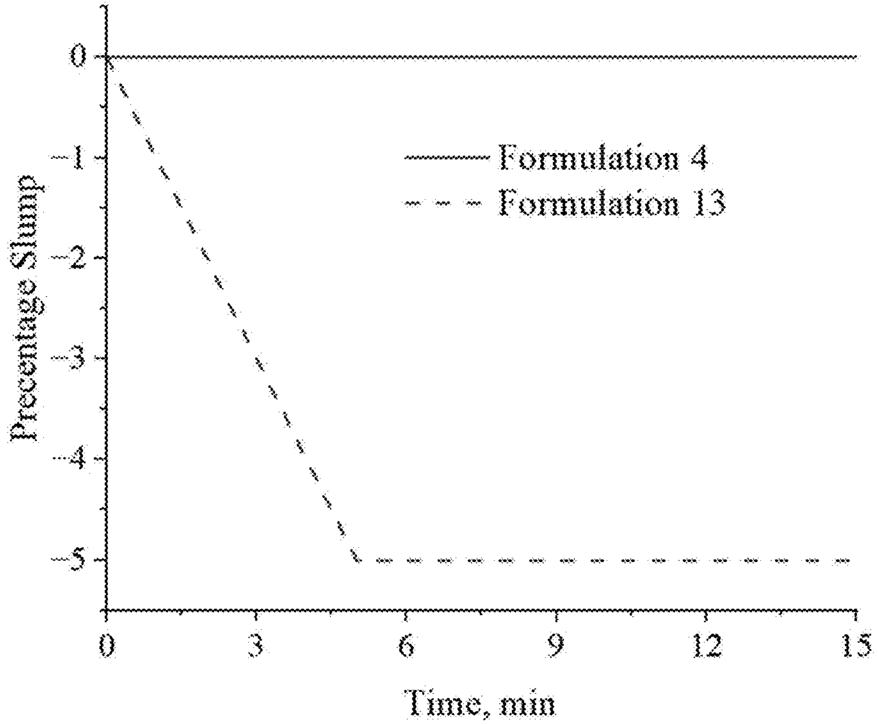
FIG. 4 is a graph demonstrating the respective buildability, measured as percentage slump over time, for two formulations (Formulations 4 and 13).

Buildability studies were performed using a residential sausage press, LEM Mighty Bite 5-pound sausage stuffer, as a piston extruder. This allows for emulation of the layer deposition of a 3D printer. Two layers were extruded from a circular opening with a diameter of 25.4 mm parallel to the print surface. The layers were stacked on top of each other to emulate layers being printed on top of each other. The initial height was recorded then measured every 5 minutes to record the height loss due to slump to verify buildability. FIG. 4 depicts the testing of two distinct formulas showing the potential variation of buildability through the alteration of the formulation.

Figures 5A, 5B:
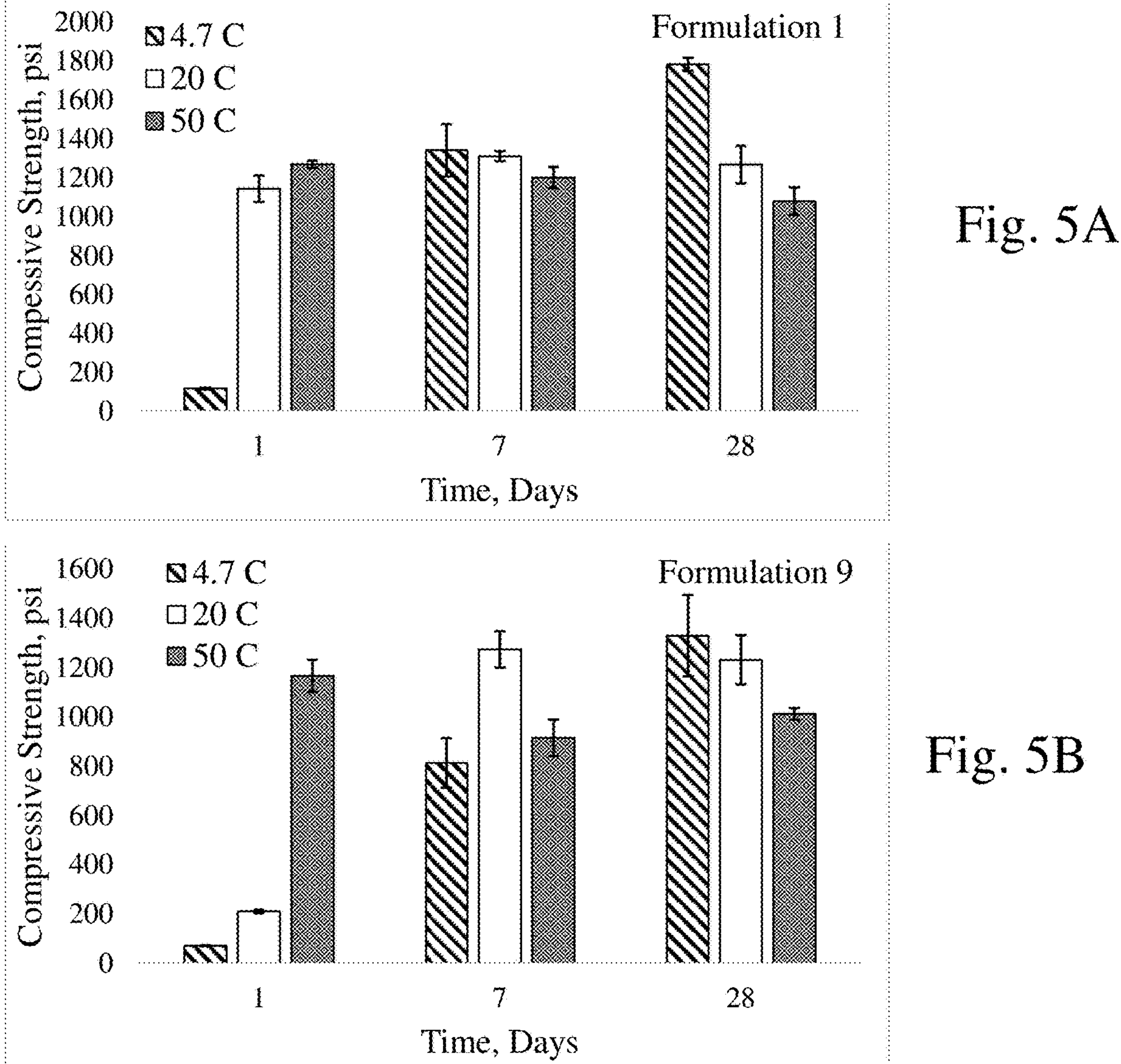
FIGS. 5A and 5B are bar graphs showing compressive strength data from pozzolanic formulation 1 (FIG. 5A) and formulation 9 (FIG. 5B) with different cure temperatures.

The only mechanical modification to the Pozzolanic Material formulation was curing temperature. All previous data was collected with curing at room temperature. Two different Pozzolanic Materials formulations were tested at two other cure temperatures: 4.5° C. and 50° C. The compressive strength results are shown in FIG. 5.

The invention claimed is:

1. A system of components for preparing a cementitious material, said system comprising an activator solution comprising an alkali metal silicate selected from the group consisting of sodium silicate, potassium silicate, lithium silicate, cesium silicate, and amorphous silica particles of 5-50 nm in diameter, wherein the alkali metal silicate is present in an amount of about 25 wt % to about 70 wt % relative to the total system components;

a pozzolanic material; and an inert, fine aggregate, wherein said system components are devoid of calcined lime and calcium sulfoaluminate;

wherein the pozzolanic material is Class C Fly Ash, metakaolin, nepheline syenite, or any combination thereof; and wherein the cementitious material exhibits from about 0 to about 5% change in a height associated with slump after about 30 minutes.

2. The system of claim 1 wherein the system further comprises a viscosity modifying agent.

3. The system of claim 2 wherein said inert, fine aggregate is selected from the group consisting of natural sand, manufactured sand, soil, stone, spent foundry sand, plastic shavings, recycled consumer plastics, or a combination thereof, wherein said aggregate has a size ranging from about 75 μm to about 4.75 mm.

4. The system of claim 3, wherein the viscosity modifying agent is a clay having a mesh size selected from a range of about 375 to about 150 mesh.

5. The system of claim 4, wherein the inert, fine aggregate has a sieve size in a range of about 75 μm to about 4.75 mm.

6. The system of claim 5, wherein the inert, fine aggregate comprises natural sand.

7. The system of claim 6, wherein said alkali metal silicate activator solution comprises an alkali metal base in an amount up to about 35 wt % to achieve about 5.0 to about 12.0 M hydroxide concentration.

8. The system of claim 7, wherein said alkali metal silicate is present in an amount of about 35 wt % to about 50 wt % relative to the total system components.

9. The system of claim 8, wherein said pozzolanic material is present in an amount from about 10 wt % to about 80 wt % relative to the total system components.

10. A cementitious mortar composition formed by a process comprising:

contacting an alkali metal silicate with an inert, fine aggregate, a viscosity modifying agent, and a pozzolanic material to provide a pozzolanic composition formulation, wherein the alkali metal silicate is selected from the group consisting of sodium silicate, potassium silicate, lithium silicate, cesium silicate, and amorphous silica particles, wherein the alkali metal silicate is present in an amount of about 25 wt % to about 70 wt % relative to the total composition, wherein said cementitious mortar composition is devoid of calcined lime and calcium sulfoaluminate, wherein the pozzolanic material is Class C Fly Ash, metakaolin, nepheline syenite, or any combination thereof, and wherein the cementitious mortar composition exhibits from about 0 to about 5% change in a height associated with slump after about 30 minutes.

11. The cementitious mortar composition of claim 10, wherein said viscosity modifying agent is a clay having a mesh size selected from a range of about 375 to about 150 mesh and the inert fine aggregate comprises silica containing particles having a sieve size within a range size of about 75 μm to about 4.75 mm.

12. The system of claim 7, wherein said alkali metal silicate is present in an amount of about 35 wt % to about 50 wt % relative to the total system components.

13. The system of claim 8, wherein said pozzolanic material is present in an amount from about 15 wt % to about 60 wt % relative to the total system components.

14. The system of claim 8, wherein said pozzolanic material is present in an amount from about 20 wt % to about 40 wt % relative to the total system components.

15. A system for preparing a cementitious material, said system comprising:

an activator solution comprising an alkali metal silicate present in an amount of about 25 wt % to about 70 wt % relative to the total system components;

a pozzolanic material;

an inert, fine aggregate, wherein said system components are devoid of calcined lime and calcium sulfoaluminate;

wherein the pozzolanic material is Class C Fly Ash, metakaolin, nepheline syenite, or any combination thereof; and wherein the cementitious material exhibits from about 0 to about 5% change in a height associated with slump after about 30 minutes.

16. The system of claim 15, wherein:

the alkali metal silicate activator solution further comprises an alkali metal base in an amount to achieve about 5.0 M to about 12.0 M hydroxide concentration; and the system comprises about 10 wt % to about 80 wt % Class C Fly Ash;

wherein the wt % is relative to the total system components.

17. The system of claim 15, wherein:

the alkali metal silicate activator solution further comprises an alkali metal base in an amount to achieve about 5.0 M to about 12.0 M hydroxide concentration; and the system comprises about 20 wt % to about 40 wt % metakaolin;

wherein the wt % is relative to the total system components.

18. The system of claim 15, wherein:

the alkali metal silicate activator solution further comprises an alkali metal base in an amount to achieve about 5.0 M to about 12.0 M hydroxide concentration; and the system comprises about 20 wt % to about 40 wt % of a combination of nepheline syenite and Class C Fly Ash;

wherein the ratio between the NS and Class C Fly Ash is about 3:1; and wherein the wt % is relative to the total system components.

19. The system of claim 15, wherein:

the alkali metal silicate activator solution further comprises an alkali metal base in an amount to achieve about 5.7 M hydroxide concentration; and the system comprises about 20 wt % to about 40 wt % Class C Fly Ash;

wherein the wt % is relative to the total system components.

20. The system of claim 15, wherein:

the alkali metal silicate activator solution further comprises an alkali metal base in an amount to achieve about 5.7 M hydroxide concentration; and the system comprises about 20 wt % to about 40 wt % of a combination of nepheline syenite and Class C Fly Ash;

wherein the ratio between the nepheline syenite and Class C Fly Ash is about 3:1; and wherein the wt % is relative to the total system components.

* * * * *